(12) United States Patent
Zhou

(10) Patent No.: US 12,287,929 B2
(45) Date of Patent: Apr. 29, 2025

(54) ROLLABLE MOUSE PAD

(71) Applicant: DONGGUAN PADMAT RUBBER CO., LTD., Guangdong (CN)

(72) Inventor: Yu Zhou, Guangdong (CN)

(73) Assignee: DONGGUAN PADMAT RUBBER CO., LTD., Guangdong (CN)

( * ) Notice: Subject to any disclaimer, the term of this patent is extended or adjusted under 35 U.S.C. 154(b) by 99 days.

(21) Appl. No.: 18/370,787

(22) Filed: Sep. 20, 2023

(65) Prior Publication Data

US 2025/0093983 A1   Mar. 20, 2025

(51) Int. Cl.
   *G06F 3/039* (2013.01)

(52) U.S. Cl.
   CPC .................... *G06F 3/0395* (2013.01)

(58) Field of Classification Search
   CPC ............... G06F 3/0395; A47B 21/0371; A47B 2021/0385
   USPC ............................................. 248/118, 118.1
   See application file for complete search history.

(56) References Cited

U.S. PATENT DOCUMENTS

| | | | | |
|---|---|---|---|---|
| 5,131,614 A * | 7/1992 | Garcia | | A47B 21/0371 248/205.2 |
| 6,464,507 B1 * | 10/2002 | Bailey | | G09B 19/22 434/408 |
| 7,229,073 B2 * | 6/2007 | David | | A63F 3/00694 273/285 |
| 7,843,432 B2 * | 11/2010 | Sween | | A45F 5/021 206/320 |
| 9,276,436 B2 * | 3/2016 | Jing | | H02J 7/0042 |
| 9,596,942 B2 * | 3/2017 | Kubota | | A47C 7/383 |
| 11,672,352 B2 * | 6/2023 | Godard | | A47B 21/0371 248/118 |
| 2005/0067319 A1 * | 3/2005 | Wei | | G06F 1/1613 206/576 |
| 2007/0235929 A1 * | 10/2007 | Nip | | A63F 3/0023 273/285 |
| 2012/0062462 A1 * | 3/2012 | Lin | | G06F 3/0395 345/163 |
| 2015/0125846 A1 * | 5/2015 | Langford | | B43L 1/00 434/408 |
| 2023/0011403 A1 * | 1/2023 | Godard | | A47C 16/00 |

* cited by examiner

*Primary Examiner* — Ingrid M Weinhold
(74) *Attorney, Agent, or Firm* — Chun-Ming Shih; HDLS.IPR SERVICES

(57) ABSTRACT

A rollable mouse pad includes a pad body (20) and a support (20). The support (20) is disposed on the pad body (10). The support (20) includes a bottom pad (21), a first support portion (22) and a second support portion (23). The first support portion (22) and the second support portion (23) are tandem disposed on the bottom pad (21). A border portion (24) is formed between the first support portion (22) and the second support portion (23). In a packaged status, the support (20) is folded along a center defined by the border portion (24), the first support portion (22) and the second support portion (23) are stacked with each other, and the pad body (10) is rolled up to wrap the support (20). Therefore, it is convenient to package) rollable mouse pad and the packaging volume can be reduced to decrease the transportation costs.

9 Claims, 7 Drawing Sheets

ROLLABLE MOUSE PAD

BACKGROUND

Technical Field

The disclosure relates to an art of mouse pad, particularly to a rollable mouse pad.

Related Art

When using a computer, a mouse pad is usually placed on a table to provide for an operation of sliding to a mouse. For the comfort of use, a support is usually integrally formed on a front side of the mouse pad. However, it is difficult to fold the mouse pad because the support is integrally formed on the mouse pad. When packaging the mouse pad, the mouse pad has to be rolled up forward along the direction from the support, and then package it. This package by rolling method occupies a large space and lead to high transportation costs. Also, the support is undetachable and therefore leads to certain inconvenience when the support is not needed to be used.

Although an independent support is available at present, and the independent support is used in accompanied with an ordinary flat mouse pad, but consumers should purchase them separately. There is no structure for positioning the mouse pad and the support in an operation, and the support tends to shift and other adverse situations may be caused when using, so that it is inconvenient for using.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to provide a rollable mouse pad, which is convenient to be packaged and the packaging size can be reduced to decrease the transportation costs.

To accomplish the above object, the disclosure provides a rollable mouse pad, which includes a pad body and a support. The support is disposed on the pad body. The support includes a bottom pad, a first support portion and a second support portion. The first support portion and the second support portion are tandem disposed on the bottom pad. A border portion is formed between the first support portion and the second support portion. In a packaged status, the support is folded along a center defined by the border portion, the first support portion and the second support portion are stacked with each other, and the pad body is rolled up to wrap the support.

The disclosure further has the following functions. It is convenient to package and the package volume is therefore reduced to effectively decrease the transportation costs. By a magnetically fixing of magnetic attraction structure, shifts are prevented when using the mouse so as to improve convenience in use.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
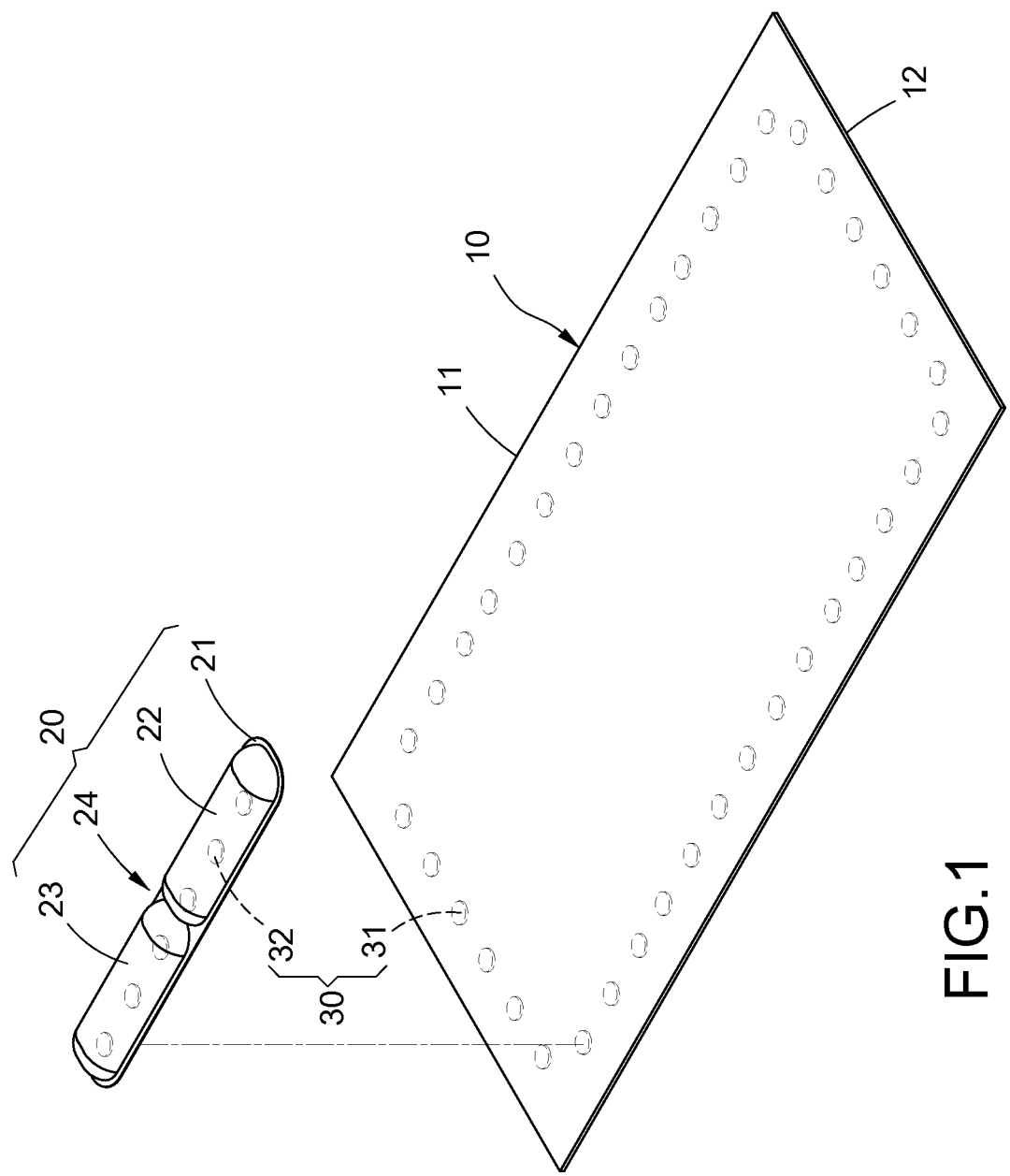
FIG. 1 is an exploded view of the rollable mouse pad of the disclosure.
Figure 2:
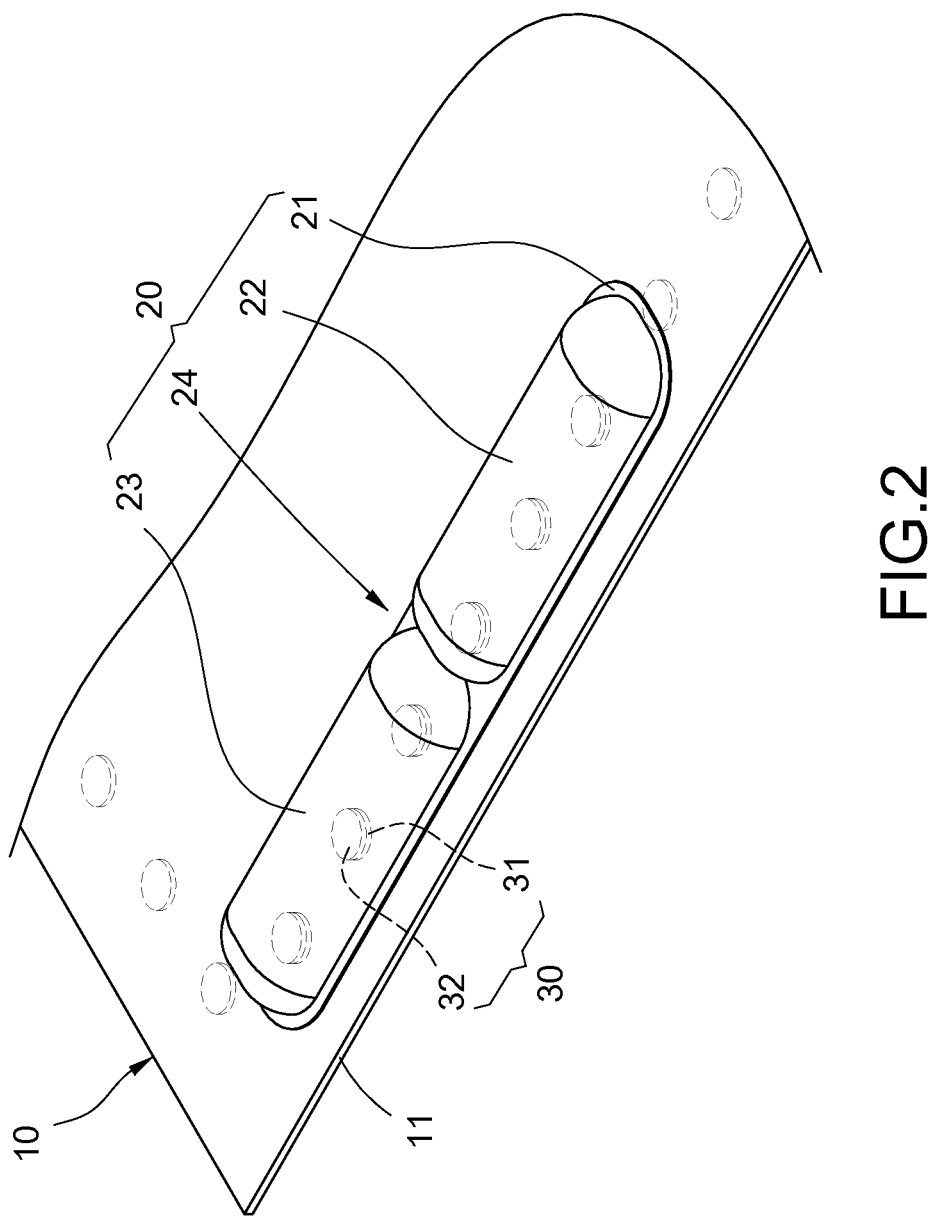
FIG. 2 is an assembled schematic view of the rollable mouse pad of the disclosure.

Please refer to FIGS. 1 and 2. The disclosure provides a rollable mouse pad, which includes a pad body 10 and a support 20.

The pad body 10 is made of a soft and flexible material and is of, but not limited to, a substantially rectangular shape, any other shapes are available. The pad body 10 of the embodiment has a pair of long edges 11 parallel to each other and a pair of short edges 12 parallel to each other. The long edges 11 and the short edges 12 are connected with each other.

The support 20 is disposed on the pad body 10. The support 20 includes a bottom pad 21, a first support portion 22 and a second support portion 23. The first support portion 22 and the second support portion 23 are tandem disposed on the bottom pad 21. A border portion 24 is formed between the first support portion 22 and the second support portion 23. The border portion 24 provides a user to place his or her wrist. The border portion 24 of the embodiment is a trench. The bottom pad 21 is made of a soft material and is of a flat shape. Each of the first support portion 22 and the second support portion 23 is a semi-ellipsoid, and the first support portion 22 and the second support portion 23 stacked with each other perform an ellipsoid.

In an embodiment, the support 20 is detachably connected on the pad body 10. The rollable mouse pad of the disclosure further includes a magnetic attraction structure 30 disposed between the pad body 10 and the support 20 so as to implement the abovementioned detachable connection.

In an embodiment, the magnetic attraction structure 30 includes multiple first magnetic attraction elements 31 and multiple second magnetic attraction elements 32. On inner sides of each long edge 11 and each short edge 12 is disposed with a part of the first magnetic attraction elements 31. The first magnetic attraction elements 31 are disposed at intervals. Each first magnetic attraction element 31 may be a magnet or a metal sheet and its shape may be a circular plate. The second magnetic attraction elements 32 are respectively disposed in the first support portion 21 and the second support portion 23 of the support 20. The second magnetic attraction elements 32 are arranged correspondingly to the first magnetic attraction elements 31 for magnetic attraction and fixing. Each second magnetic attraction element 32 may also be a magnet or a metal sheet and its shape may also be a circular plate.

In an embodiment, the support 20 may be selectively disposed at one side of the pad body 10 and adjustable according to a left-handed user or a right-handed user.

Figure 3:
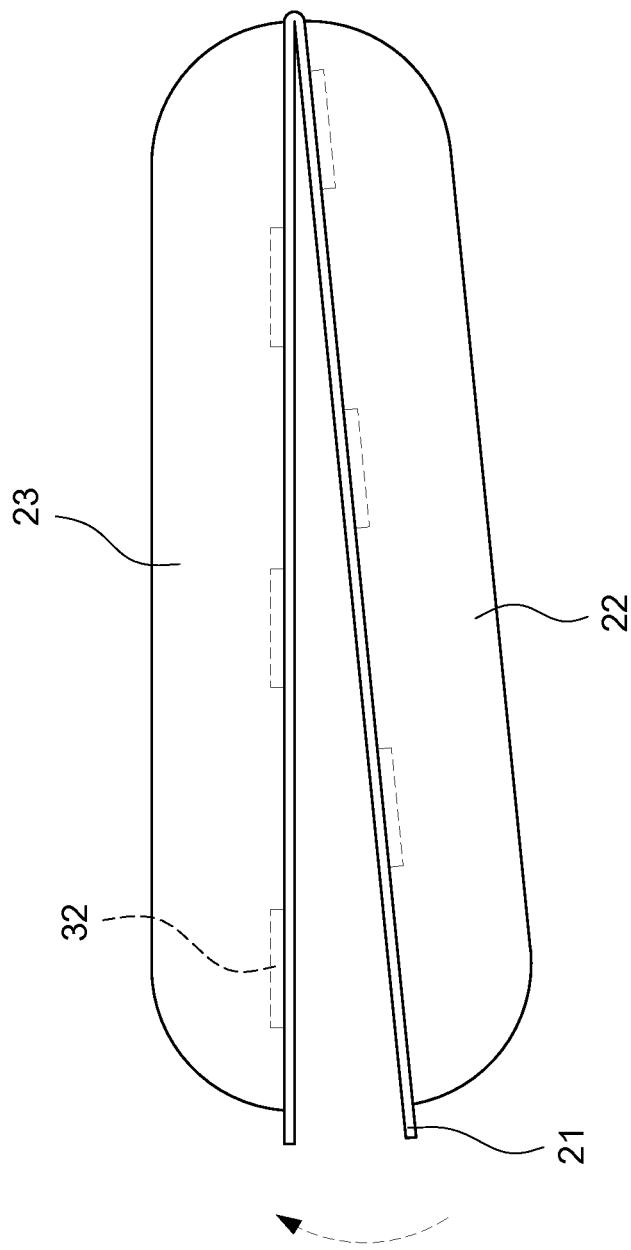
FIG. 3 is a schematic view of the support of the disclosure in the folding process.
Figure 4:
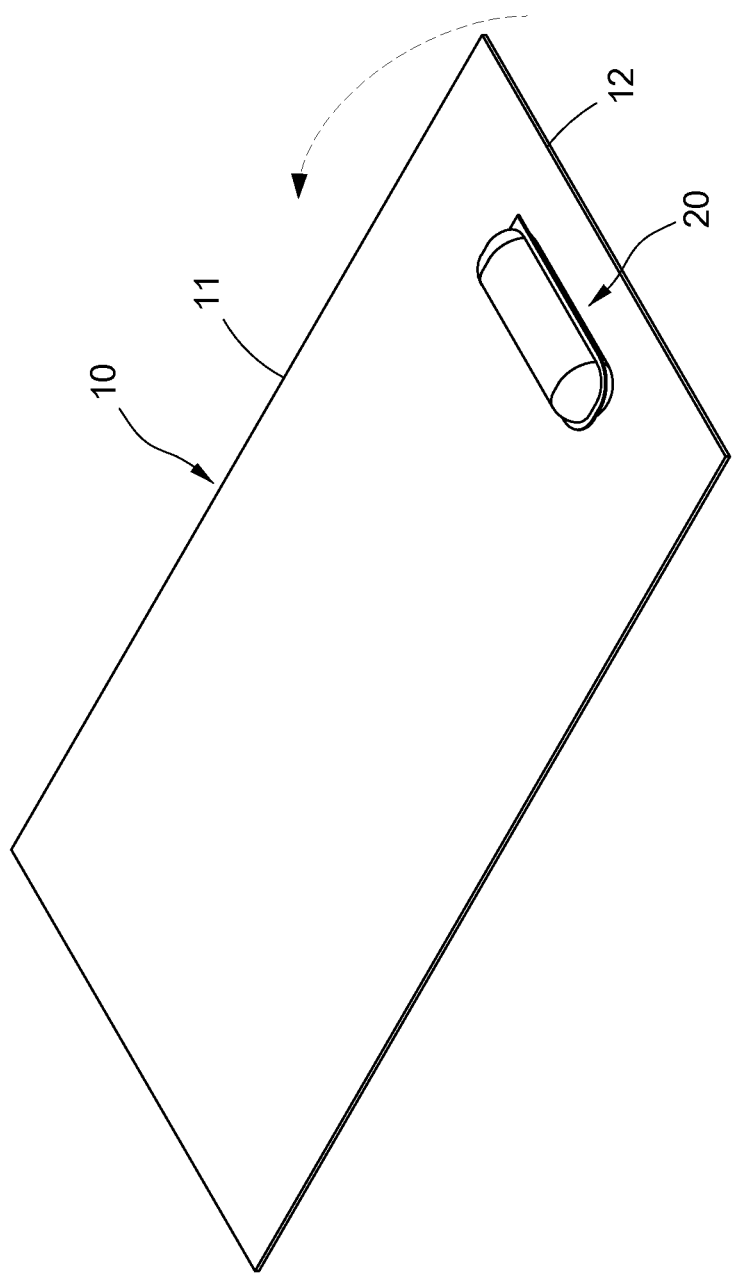
FIG. 4 is a schematic view of the rollable mouse pad of the disclosure in the rolling process.
Figure 5:
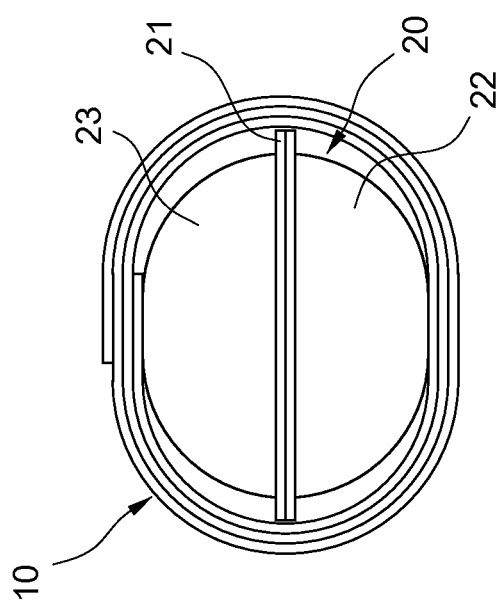
FIG. 5 is a schematic view of the rollable mouse pad of the disclosure after being rolled up.

Please refer to FIGS. 3-5. In a packaged status, the support 20 is folded along a center defined by the border portion 24, the first support portion 22 and the second support portion 23 are stacked with each other to place the first support portion 22 and the second support portion 23 at the short edge 12 at an end of the pad body 10 and opposite to each other, and the pad body 10 is rolled up along the direction of the long edges 11 to wrap the support 20. The manner is convenient for packaging and the package occupies a small space so as to effectively decrease the transportation costs. The support 20 and the pad body 10 are magnetically attracted and fixed by the magnetic attraction structure 30 in an operation. The support 20 may be directly detached from the pad body 10 in case of an operation without the support 20. When using the support 20, the support 20 should be merely places on any side of the pad body 10, and then positioned by the magnetic attraction structure 30 to prevent the support 20 from moving in an operation of a mouse on the pad body 10 so as to improve convenience of operation.

In an embodiment, when the first support portion 22 and the second support portion 23 are stacked with each other, each second magnetic attraction element 32 in the first support portion 22 is disposed between adjacent two of the second magnetic attraction elements 32 in the second support portion 23 (as shown in FIG. 3) to avoid repellence and being not easy to be superposed because of the same magnetic pole.

In an embodiment, an overall length of the support 20 with the first support portion 22 and the second support portion 23 stacked with each other is less than the length of the short edge 12 of the pad body 10 so that the support 20 will not be exposed from the pad body 10 when wrapped.

In an embodiment, the length of the long edge 11 of the pad body 10 is 800 mm, the length of the short edge 12 is 300 mm, and the length of the support 20 is 500 mm. When the first support portion 22 and the second support portion 23 of the support 20 are stacked with each other, they can be placed at the left end of the pad body 10 and then perform wrapped by rolling the pad body 10 up along the direction of the long edge 11 of the pad body 10.

Figure 6:
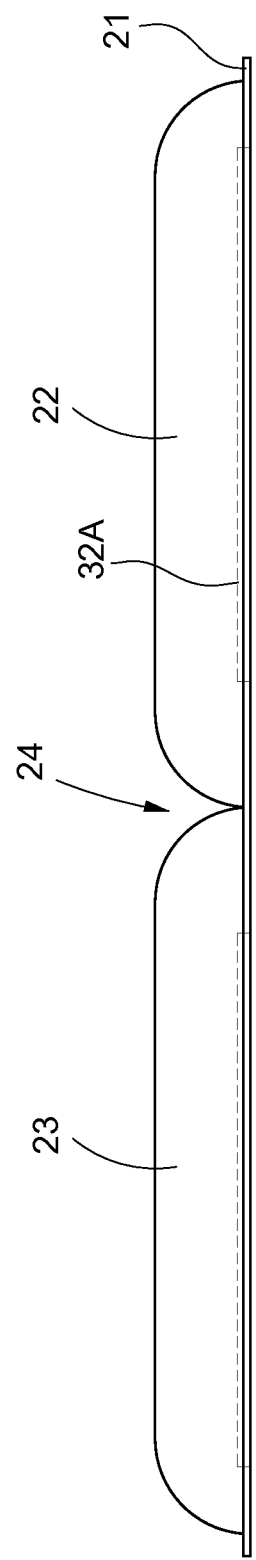
FIG. 6 is a schematic view of another embodiment of the support of the disclosure.

Please refer to FIG. 6. Besides the above embodiments, each second magnetic attraction element 32A of the magnetic attraction structure of the disclosure may be a strip-shaped plate. One of the second magnetic attraction elements 32A is embedded in the bottom pad 21 and the first support portion 22, and the other second magnetic attraction element 32A is embedded in the bottom pad 21 and the second support portion 23.

Figure 7:
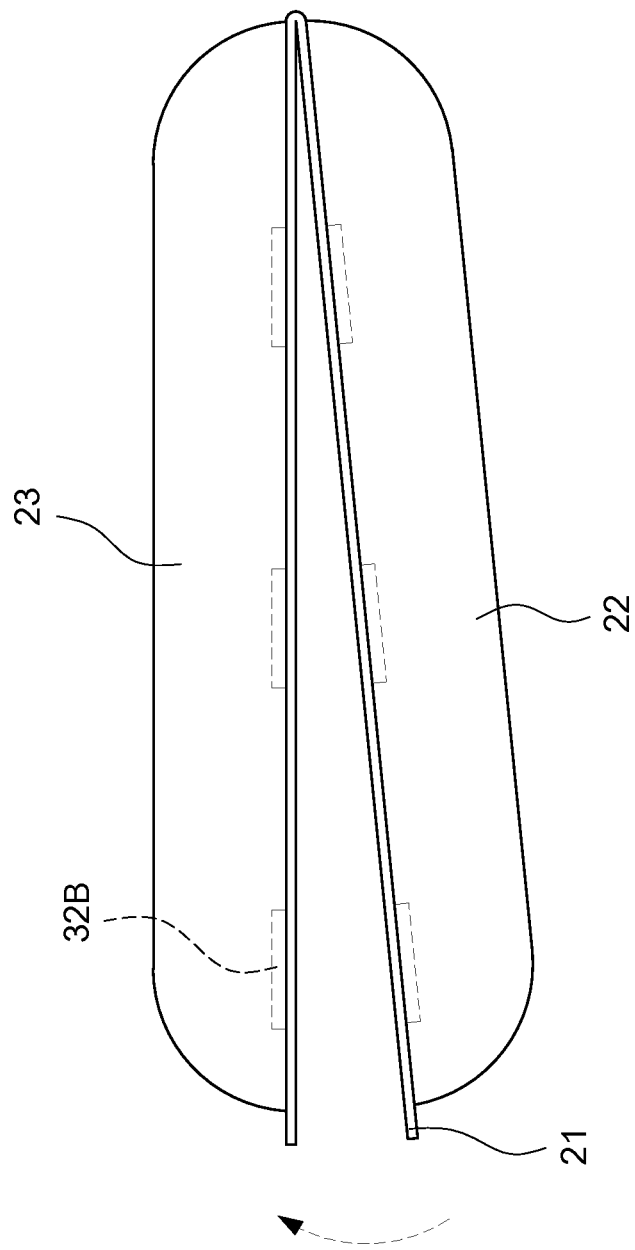
FIG. 7 is a schematic view of still another embodiment of the support of the disclosure.

Please refer to FIG. 7. When each first magnetic attraction elements 31 is a metal sheet and each second magnetic attraction element 32B is a magnet, each second magnetic attraction element 32B in the first support portion 22 can be arranged correspondingly to each second magnetic attraction element 32B in the second support portion 23 and they generate magnetic attraction by the inversion of magnetic poles of each second magnetic attraction element 32B (i.e., the N-pole of each second magnetic attraction element 32B in the first support portion 22 faces downward, and the S-pole of each second magnetic attraction element 32B in the second support portion 23 faces downward).

While this disclosure has been described by means of specific embodiments, numerous modifications and variations could be made thereto by those skilled in the art without departing from the scope and spirit of this disclosure set forth in the claims.

What is claimed is:

1. A rollable mouse pad comprising:
a pad body (10); and
a support (20) configured to support a user's wrist, the support detachably connected to the pad body (10), the support (20) comprising a bottom pad (21), a first support portion (22) and a second support portion (23), the first support portion (22) and the second support portion (23) being tandem disposed on the bottom pad (21), and a border portion (24) being formed between the first support portion (22) and the second support portion (23);
wherein, in a packaged status, the support (20) is detached from the pad body and folded along a center defined by the border portion (24), such that the first support portion (22) and the second support portion (23) are stacked with each other, and the pad body (10) is rolled up to wrap around the support (20).

2. The rollable mouse pad of claim 1, further comprising a magnetic attraction structure (30) disposed between the pad body (10) and the support (20).

3. The rollable mouse pad of claim 2, wherein the magnetic attraction structure (30) comprises multiple first magnetic attraction elements (31) and multiple second magnetic attraction elements (32) magnetically attractable with the first magnetic attraction elements 31 correspondingly, the first magnetic attraction elements (31) are arranged on the pad body (10) at intervals, and the second magnetic attraction elements (32) are respectively disposed in the first support portion (22) and the second support portion (23) and the second magnetic attraction elements (32) are arranged corresponding to the first magnetic attraction elements (31) respectively.

4. The rollable mouse pad of claim 3, wherein the pad body (10) comprises a pair of long edges (11) parallel to each other and a pair of short edges (12) parallel to each other, the long edges (11) and the short edges (12) are connected with each other, inner sides of each of the long edges (11) and the short edges (12) are disposed with a part of the first magnetic attraction elements (31) at intervals, and the support (20) is selectively fixed on one of the long edges (11) or one of the short edges (12).

5. The rollable mouse pad of claim 4, wherein an overall length of the first support portion (22) and the second support portion (23) of the support (20), which is folded, is less than a length of the short edge (12) of the pad body (10).

6. The rollable mouse pad of claim 3, wherein each second magnetic attraction element (32) in the first support portion (22) is disposed between adjacent two of the second magnetic attraction elements (32) in the second support portion (23) when the first support portion (22) is stacked on the second support portion (23).

7. The rollable mouse pad of claim 3, wherein the first magnetic attraction element (31) is a magnet or a metal piece.

8. The rollable mouse pad of claim 3, wherein the second magnetic attraction elements (32B) in the first support portion (22) are arranged corresponding to the second magnetic attraction elements (32B) in the second support portion (23) respectively when the first support portion (22) is stacked on the second support portion (23).

9. The rollable mouse pad of claim 1, further comprising a magnetic attraction structure (30), wherein the magnetic attraction structure (30) comprises multiple first magnetic attraction elements (31) and at least two second magnetic attraction elements (32A) magnetically attractable to the first magnetic attraction elements (31) respectively, each second magnetic attraction element (32A) is a strip-shaped plate, one of the second magnetic attraction elements (32A) is disposed at the bottom pad (21) corresponding to the first support portion (22), and another second magnetic attraction of the elements (32A) is disposed at the bottom pad (21) corresponding to the second support portion (23).

\* \* \* \* \*